(12) United States Patent
Miyazaki et al.

(10) Patent No.: US 8,023,098 B2
(45) Date of Patent: Sep. 20, 2011

(54) PRODUCTION METHOD FOR BIREFRINGENT FILM, BIREFRINGENT FILM, AND LAMINATE

(75) Inventors: Junzo Miyazaki, Osaka (JP); Shouichi Matsuda, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 267 days.

(21) Appl. No.: 12/440,481

(22) PCT Filed: Aug. 29, 2007

(86) PCT No.: PCT/JP2007/066738
§ 371 (c)(1),
(2), (4) Date: Mar. 9, 2009

(87) PCT Pub. No.: WO2008/050536
PCT Pub. Date: May 2, 2008

(65) Prior Publication Data
US 2009/0262297 A1    Oct. 22, 2009

(30) Foreign Application Priority Data

Oct. 26, 2006    (JP) ................................. 2006-290758

(51) Int. Cl.
G02F 1/13      (2006.01)
(52) U.S. Cl. ........................................................ 349/194
(58) Field of Classification Search ................ None
See application file for complete search history.

(56) References Cited

U.S. PATENT DOCUMENTS

| | | | |
|---|---|---|---|
| 2005/0104037 A1 | 5/2005 | Lazarev et al. | |
| 2005/0109986 A1 | 5/2005 | Dutova et al. | |
| 2005/0151908 A1* | 7/2005 | Nomura et al. | 349/136 |
| 2007/0166533 A1 | 7/2007 | Lazarev et al. | |

FOREIGN PATENT DOCUMENTS

| | | |
|---|---|---|
| CN | 1846155 A | 10/2006 |
| JP | 2006-072309 A | 3/2006 |
| JP | 2006-091613 A | 4/2006 |
| JP | 2007-511661 A | 5/2007 |
| JP | 2007-512236 A | 5/2007 |
| KR | 2006-0037448 A | 5/2006 |
| WO | 2005/031409 A1 | 4/2005 |
| WO | 2005/051926 A1 | 6/2005 |
| WO | 2005-061239 A2 | 7/2005 |

OTHER PUBLICATIONS

International Search Report of PCT/JP2007/066738, mailing date of Oct. 30, 2007.
Korean Office Action dated Dec. 20, 2010, issued in corresponding Korean Patent Application No. 2009-7004670.
Japanese Office Action dated Apr. 20, 2011, issued in corresponding Japanese Patent Application No. 2006-290758.

\* cited by examiner

*Primary Examiner* — Sung H Pak
(74) *Attorney, Agent, or Firm* — Westerman, Hattori, Daniels & Adrian, LLP

(57) ABSTRACT

Provided is a production method for a thin birefringent film with a satisfactory alignment property, in which a refractive index is controlled three-dimensionally and optical properties are unlikely to decrease in the case where the birefringent film is placed under high temperature and high humidity. The production method for a birefringent film of the present invention includes: the step (1) of preparing a solution that exhibits a nematic liquid crystal phase, containing at least one kind of polycyclic compound containing a $-SO_3M$ group and/or a $-COOM$ group (M represents a counter ion) and a solvent; the step (2) of preparing a base material at least one surface of which is subjected to a hydrophilization treatment; and the step (3) of applying the solution prepared in the step (1) to the surface of the base material prepared in the step (2), the surface being subjected to the hydrophilization treatment, followed by drying, in which a contact angle of water at 23° C. on the surface of the base material prepared in the step (2), the surface being subjected to the hydrophilization treatment is 45° or less.

8 Claims, 3 Drawing Sheets

PRODUCTION METHOD FOR BIREFRINGENT FILM, BIREFRINGENT FILM, AND LAMINATE

TECHNICAL FIELD

The present invention relates to a production method for a birefringent film, a birefringent film obtained by the method, and a laminate including the birefringent film.

BACKGROUND ART

A liquid crystal display (hereinafter, referred to as LCD) is a device which displays a character and an image using electro-optical properties of a liquid crystal molecule, and has been widely applied to a cellular phone, a notebook computer, a liquid crystal television, etc. However, since the LCD utilizes a liquid crystal molecule with optical anisotropy, there are such problems that excellent display properties are demonstrated in a certain one direction but, in another direction, a screen becomes dark or indistinct. In order to solve the above-mentioned problems, a birefringent film has been widely employed for the LCD, As one kind of the birefringent film, a birefringent film in which a refractive index ellipsoid satisfies the relationship represented by nx>nz>ny is disclosed (see e.g., Patent Document 1). The birefringent film having such a relationship of refractive index has conventionally been produced by attaching a shrinkable film to both sides of a polymer film, and stretching the resultant in such a manner as to expand in the thickness direction. Therefore, a conventional birefringent film having the relationship of a refractive index is likely to increase in the thickness, which makes it difficult to reduce the thickness of the liquid crystal display.

Further, conventionally, the birefringent film having the above-mentioned relationship of a refractive index has the following problems: when the birefringent film is placed under high temperature and high humidity, the optical properties are likely to decrease, and light leakage is caused by the defects of an alignment property. Patent Document 1: JP 2006-072309 A

DISCLOSURE OF THE INVENTION

Problems to be Solved by the Invention

An object of the present invention is to provide a production method for a thin birefringent film with a satisfactory alignment property, in which a refractive index is controlled three-dimensionally and optical properties are unlikely to decrease when the film is placed under high temperature and high humidity. Another object of the present invention is to provide a thin birefringent film excellent in optical properties by such a production method, and a laminate including such a birefringent film.

Means for Solving the Problems

A production method for a birefringent film, including; the step (1) of preparing a solution that exhibits a nematic liquid crystal phase, containing at least one kind of polycyclic compound containing a —$SO_3M$ group and/or a —COOM group (M represents a counter ion) and a solvent; the step (2) of preparing a base material at least one surface of which is subjected to a hydrophilization treatment; and the step(3) of applying the solution prepared in the step (1) to the surface of the base material prepared in the step (2), the surface being subjected to the hydrophilization treatment, followed by drying, in which a contact angle of water at 23° C. on the surface of the base material prepared in the step (2), the surface being subjected to the hydrophilization treatment, is 45° or less.

In a preferred embodiment, the hydrophilization treatment is at least one selected from a corona treatment, a plasma treatment, an ultrasonic cleaning treatment, an alkali treatment, and an anchor coat treatment.

In a preferred embodiment, the base material is a glass substrate or a polymer film.

In a preferred embodiment, the polycyclic compound includes an acenaphtho [1,2-b] quinoxaline derivative represented by General Formula (I) shown below:
where k and l each independently represent an integer of 0 to 4; m and n each independently represent an integer of 0 to 6; and each M represent a counter ion; and k, l, m, and n are not simultaneously 0.

[Chemical Formula 1]

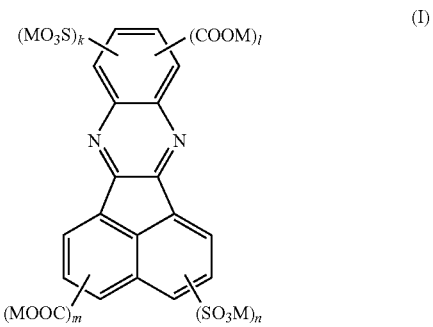

(I)

According to another aspect of the present invention, a birefringent film is provided. The birefringent film of the present invention is obtained by the production method of the present invention.

In a preferred embodiment, the birefringent film of the present invention has a refractive index ellipsoid satisfying a relationship; nx>nz>ny.

In a preferred embodiment, a thickness of the birefringent film of the present invention is 0.05 μm to 10 μm.

According to another aspect of the present invention, a laminate is provided. The laminate of the present invention has at least the birefringent film of the present invention and a polarizer.

Effects of the Invention

According to the present invention, the production method for a thin birefringent film with a satisfactory alignment property, in which a refractive index is controlled three-dimensionally and optical properties are unlikely to decrease when the film is placed under high temperature and high humidity, can be provided. Further, the thin birefringent film excellent in optical properties can be provided by such a production method, and the laminate including such a birefringent film can be provided.

The effects as described above can be expressed by applying a solution that exhibits a nematic liquid crystal phase, containing a particular polycyclic compound and a solvent, to the surface of a base material, followed by drying, when producing a birefringent film, and subjecting the surface of the base material to a hydrophilization treatment so that a contact angle of water at 23° C. becomes a particular value or less before applying the solution.

BEST MODE FOR CARRYING OUT THE INVENTION

Figure 1:
[FIG. 1] An image observed with a polarization microscope of a birefringent film (1).

The "birefringent film" used herein refers to a film that shows birefringence in the in-plane direction and/or in the thickness direction, and includes a film whose birefringent index at a wavelength of 590 nm in the in-plane direction and/or in the thickness direction is $1 \times 10^{-4}$ or higher.

[A. Production Method for Birefringent Film]

The production method for a birefringent film of the present invention includes:

the step (1) of preparing a solution that exhibits a nematic liquid crystal phase, containing at least one kind of polycyclic compound containing a —$SO_3M$ group and/or —COOM group (M represents a counter ion), and a solvent;

the step (2) of preparing a base material at least one surface of which is subjected to a hydrophilization treatment; and the step (3) of applying the solution prepared in the step (1) to the surface of the base material prepared in the step (2), the surface being subjected to a hydrophilization treatment, followed by drying, in which a contact angle of water at 23° C. on the surface of the base material prepared in the step (2), the surface being subjected to the hydrophilization treatment, is 45° or less.

As the polycyclic compound containing a —$SO_3M$ group and/or a —COOM group (H represents a counter ion) used in the step (1), any suitable polycyclic compounds can be used as long as they contain a —$SO_3M$ group and/or a —COOM group. The polycyclic compound preferably exhibits a liquid crystal phase in a solution state (i.e. a lyotropic liquid crystal). The liquid crystal phase is preferably a nematic liquid crystal phase in terms of an excellent alignment property.

As the polycyclic compound, acenaphtho [1,2-b] quinoxaline derivative represented by General Formula (I) is preferably contained. In General Formula (I), k and l respectively are integers of 0 to 4 independently, and m and n are integers of 0 to 6 independently. Each M represents a counter ion. It should be noted that k, l, m and n are not 0 concurrently. The polycyclic compound used in the step (1) may be a composition containing at least two kinds, preferably 2 to 6 kinds, more preferably 2 to 4 kinds of polycyclic compounds represented by General Formula (I), in which substitution positions of a —$SO_3M$ group and/or a —COOM group are different, except for those which are contained in a trace amount as impurities.

[Chemical Formula 2]

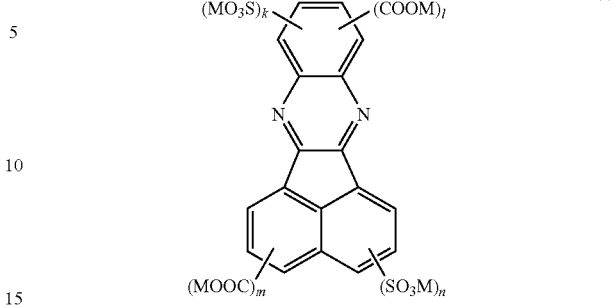

Such a polycyclic compound can form a stable liquid crystal phase in a solution, and can produce a transparent birefringent film which has a high in-plane birefringent index and has low or no absorption in a visible light area from a solution by a solvent casting method.

In General Formula (I), M represents a counter ion, and is preferably a hydrogen atom, an alkali metal atom, an alkaline earth metal atom, a metal ion, or a substituted or un-substituted ammonium ion. Mentioned as the above-mentioned metal ion are, for example, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $CO^{2+}$, $Mn^{2+}$, $Ce^{3+}$, etc. When the birefringent film of the present invention is formed of an aqueous solution, a group which improves the solubility in water is selected as the above-mentioned M at the beginning, and after film formation, the above-mentioned M can be replaced by a group which is insoluble in water or is difficult to dissolve in water so as to improve the water resistance of a film.

The above-mentioned acenaphtho [1,2-b] quinoxaline derivative can be obtained by sulfonating an acenaphtho [1,2-b] quinoxaline carboxylic acid with sulfuric acid, fuming sulfuric acid, or chlorosulfonic acid as shown below.

[Chemical Formula 3]

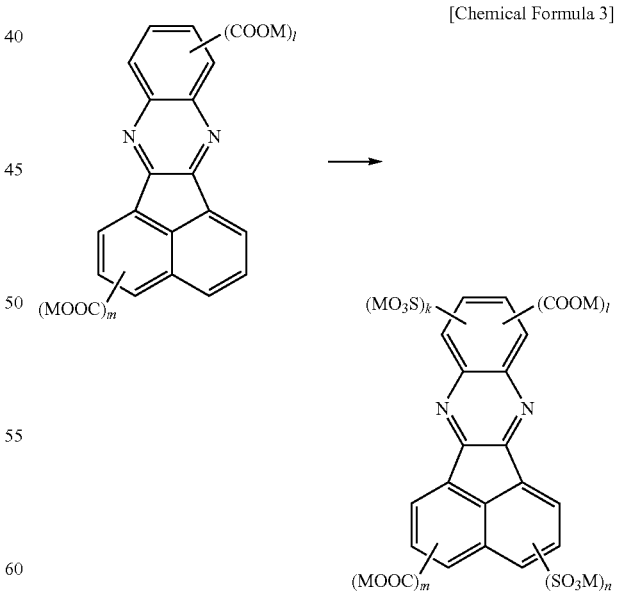

In the above Chemical Formula, k and l each independently represent an integer of 0 to 4; m and n each independently represent an integer of 0 to 6; and each M represents a counter ion. It should be noted that k, l, m, and n are not simultaneously 0.

Or, the acenaphtho [1,2-b] quinoxaline derivative can also be obtained by subjecting a sulfo and/or carboxy derivative of benzene-1,2-diamine and a sulfo and/or carboxy derivative of acenaphthoquinone to a condensation reaction as shown below.

[Chemical Formula 4]

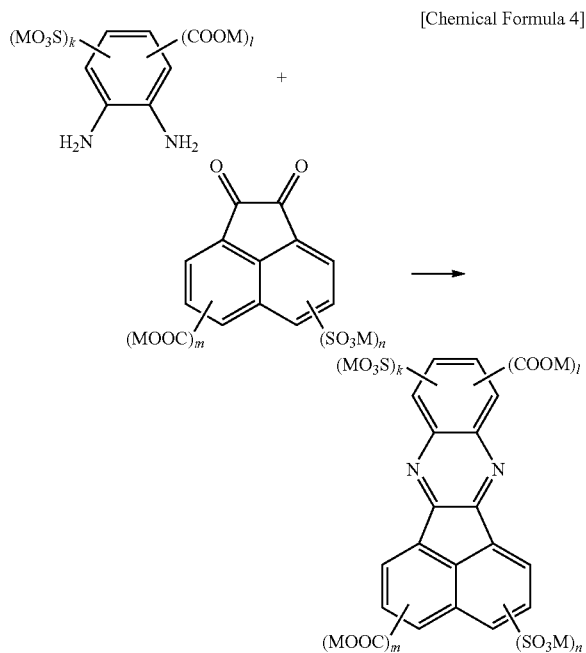

The solvent used in the above step (1) is used for dissolving the above-mentioned polycyclic compound to develop a nematic liquid crystal phase. Any suitable solvent can be selected as the above-mentioned solvent. For example, as the above-mentioned solvent, inorganic solvents such as water may be used, and organic solvents such as alcohols, ketones, ethers, esters, aliphatic and aromatic hydrocarbons, halogenated hydrocarbons, amides, and cellosolves may be used. Examples of the solvent include n-butanol, 2-butanol, cyclohexanol, isopropyl alcohol, t-butyl alcohol, glycerin, ethylene glycol, acetone, methyl ethyl ketone, methyl isobutyl ketone, cyclohexanone, cyclopentanone, 2-pentanone, 2-hexanone, diethyl ether, tetrahydrofuran, dioxane, anisole, ethyl acetate, butyl acetate, methyl lactate, n-hexane, benzene, toluene, xylene, chloroform, dichloromethane, dichloroethane, dimethyl formamide, dimethyl acetoamide, methyl cellosolve, and ethyl cellosolve. The above-mentioned solvents can be used alone or in combination.

Water is most preferred as the above-mentioned solvent. The electric conductivity of water is preferably 20 μS/cm or lower, more preferably 0.001 μS/cm to 10 μS/cm, and particularly preferably 0.01 μS/cm to 5 μS/cm. The lower limit of the electric conductivity of water is 0 μS/cm. By adjusting the electric conductivity of water to within the above-mentioned range, a birefringent film having a high in-plane birefringent index can be obtained.

The concentration of a polycyclic compound in the above-mentioned solution can be suitably adjusted to a range, in which a nematic liquid crystal phase is developed, according to the type of a polycyclic compound to be used. The concentration of the polycyclic compound in the above-mentioned solution is preferably 5% by weight to 40% by weight, more preferably 5% by weight to 35% by weight, and particularly preferably 5% by weight to 30% by weight. By adjusting the concentration of the solution to the above-mentioned range, the solution can form a stable liquid crystal state. The above-mentioned nematic liquid crystal phase can be identified and distinguished from any other phase on the basis of an optical pattern of a liquid crystal phase observed with a polarization microscope.

The above-mentioned solution may further contain any suitable additive. Mentioned as the above-mentioned additive are, for example, a surfactant, plasticizer, thermostabilizer, light stabilizer, lubricant, anti-oxidant agent, UV absorber, flame retardant, colorant, antistatic agent, compatibilizer, cross linking agent, thickener, etc. The addition amount of the above-mentioned additive is preferably larger than 0 part by weight and 10 parts by weight or smaller based on 100 parts by weight of the solution.

The above-mentioned solution may further contain a surfactant. A surfactant is used for improving the wettability and application properties of a polycyclic compound to the surface of a base material. The above-mentioned surfactant is preferably a nonionic surfactant. The addition amount of the above-mentioned surfactant is preferably larger than 0 part by weight and 5 parts by weight or smaller based on 100 parts by weight of the solution.

The "hydrophilization treatment" in the step (2) above refers to treatment for reducing the contact angle of water to the base material. The above-mentioned hydrophilization treatment is used for improving the wettability and application properties of the surface of a base material to which the solution prepared in the step (1) is applied.

In the hydrophilization treatment, the contact angle of water at 23° C. of a base material is set to be 45° or less. By setting the contact angle of water of the base material to be in the above range, a thin birefringent film with a satisfactory alignment property can be provided, in which a refractive index is controlled three-dimensionally and optical properties are unlikely to decrease when the birefringent film is placed under high temperature and high humidity. The contact angle of water at 23° C. of the base material is preferably 5° to 45°, more preferably 5° to 43°, and much more preferably 5° to 40°.

The above-mentioned hydrophilization treatment reduces the contact angle of water to the base material at 23° C. by preferably 10% or more, more preferably 15% to 80%, and particularly preferably 20% to 70% as compared with the contact angle before the hydrophilization treatment. It should be noted that the reduction percentage (%) is calculated by the following equation; {(Contact angle before treatment−Contact angle after treatment)/Contact angle before treatment}× 100.

The above-mentioned hydrophilization treatment reduces the contact angle of water to the base material at 23° C. by preferably 5° or more, more preferably 10° to 65° and particularly preferably 20° to 65° as compared with the contact angle of water to the base material at 23° C. before treatment.

Any suitable methods can be employed as the above-mentioned hydrophilization treatment. The above-mentioned hydrophilization treatment may be, for example, a dry treatment or a wet treatment. Mentioned as the dry treatment are, for example, an electro-discharge treatment such as a corona treatment, a plasma treatment, and a glow discharge treatment; a flame treatment; ozone treatment; UV ozone treatment; an electrolytic-dissociation actinic-rays treatment such as ultraviolet treatment and electron beam treatment. Mentioned as the wet treatment are, for example, an ultrasonic cleaning treatment using a solvent such as water and acetone, alkali treatment, and anchor coat treatment. These treatments may be used alone or in combination.

Preferred as the above-mentioned hydrophilization treatment is at least one selected from a corona treatment, plasma treatment, ultrasonic cleaning treatment, alkali treatment, or anchor coat treatment. According to the hydrophilization treatment as described above, a thin birefringent film with a satisfactory alignment property can be provided, in which a refractive index is controlled three-dimensionally and optical properties are unlikely to decrease when the birefringent film is placed under high temperature and high humidity. The conditions of the hydrophilization treatment, for example, a treatment time and strength, can be adjusted appropriately and suitably so that the contact angle of water of the base material falls in the above range, The above-mentioned corona treatment refers to treatment for reforming the base material surface by causing the base material to pass through corona discharge which is generated by ionization of air between electrodes due to dielectric breakdown by applying high frequency current and high voltage to between electrodes insulated and a grounded dielectric roll. In the corona treatment, the contact angle of water at 23° of the base material can be decreased to a desired value, for example, by increasing the strength of corona discharge or prolonging a time during which the base material is allowed to pass through the corona discharge.

Typically mentioned as the above-mentioned plasma treatment is treatment for reforming the base material surface by causing the base material to pass through low-temperature plasma which is generated by ionization of some of gas molecules at the time when glow discharge is induced in inorganic gases such as a low-pressure inert gas, oxygen, and a halogen gas. In the plasma treatment, the contact angle of water at 23° of the base material can be decreased to a desired value, for example, by increasing the strength of corona discharge or prolonging a time during which the base material is allowed to pass through the glow discharge.

Typically as the above-mentioned ultrasonic cleaning treatment is treatment for improving the wettability of the base material by removing contaminants on the base material surface by immersing the base material in water or an organic solvent, and applying ultrasonic wave to the base material. In the ultrasonic cleaning treatment, the contact angle of water at 23° of the base material can be decreased to a desired value, for example, by empirically selecting a solvent having high solubility of a contaminant or prolonging a cleaning time.

Typically as the above-mentioned alkali treatment is treatment for reforming the base material surface by immersing the base material in an alkali treatment liquid in which a basic substance is dissolved in water or an organic solvent. In the alkali treatment, the contact angle of water at 23° C. of the base material can be decreased to a desired value, for example, by enhancing the pH of a treatment liquid or prolonging an immersion time.

Typically as the above-mentioned anchor coat treatment is treatment for applying an anchor coat agent to the base material surface. In the anchor coat treatment, the contact angle of water at 23° C. of the base material can be decreased to a desired value, for example, by using an anchor coat agent containing a polyvinyl alcohol-based resin or a urethane-based resin.

The base material used in the step (2) is used for uniformly casting a solution containing the above-mentioned polycyclic compound and solvent. Any suitable base material can be selected as the above-mentioned base material. Mentioned as the above-mentioned base material are, for example, a glass substrate, a quartz substrate, a polymer film, a plastic substrate, metal plates such as an aluminum plate and an iron plate, a ceramic substrate, a silicon wafer, etc. Preferred as the above-mentioned base material is a glass substrate or a polymer film.

Any suitable substances may be selected as the above-mentioned glass substrate. Preferably, the above-mentioned glass substrate is a substrate to be used for a liquid crystal cell, and is, for example, a soda-lime (blue plate) glass containing an alkali component or a low alkali borax glass. A commercially available substance can be used for the above-mentioned glass substrate as it is. Mentioned as a commercially available glass substrate are, for example, a glass code: 1737 manufactured by CORNING Corporation, a glass code: AN635 manufactured by Asahi glass Co., Ltd., or a glass code: NA-35 manufactured by NH TECHNO GLASS Corporation, etc.

Any suitable substances can be selected as a resin for forming the above-mentioned polymer film. Preferably, the above-mentioned polymer film includes a thermoplastic resin. Examples of the thermoplastic resin include a polyolefin resin, a polynorbornene-based resin, a cycloolefin-based resin, a polyvinyl chloride-based resin, a cellulose-based resin, a styrene-based resin, polymethyl methacrylate, polyvinyl acetate, a polyvinylidene chloride-based resin, a polyamide-based resin, a polyacetal-based resin, a polycarbonate-based resin, a polybutylene terephthalate-based resin, a polyethylene terephthalate-based resin, a polysulfone-based resin, a polyethersulfone-based resin, a polyetherether ketone-based resin, a polyarylate-based resin, a polyamide imide-based resin, a polyimide-based resin. The above-mentioned thermoplastic resins can be used alone or in combination. Moreover, the above-mentioned thermoplastic resins can also be used after being subjected to any suitable polymer modification. Mentioned as the above-mentioned polymer modification are, for example, modifications of copolymerization, cross-linking formation, molecular terminal, stereoregularity, etc.

As the base material used in the present invention, a polymer film containing a cyclic olefin-based resin such as a polynorbornene-based resin and a cycloolefin-based resin and/or a cellulose-based resin is preferred. The reason for this is as follows: the polymer film is excellent in wettability of a polycyclic compound, and can provide a thin birefringent film with a satisfactory alignment property, in which a refractive index is controlled three-dimensionally and optical properties are unlikely to decrease when the birefringent film is placed under high temperature and high humidity.

The cyclic olefin-based resin is a generic name for a resin polymerised using cyclic olefin as a polymerization unit, and examples thereof include the resins described in JP 1-240517 A, JP 3-14882 A, and JP 3-122137 A. Specific examples include a ring-opening (co)polymer of cyclic olefin, an addition polymer of cyclic olefin, a copolymer (typically, a random copolymer) of cyclic olefin and α-olefin such as ethylene or propylene, a graft denatured body obtained by denaturing the polymers with unsaturated carboxylic acid or a derivative thereof, and a hydride thereof. Specific examples of the cyclic olefin include a norbornene-based monomer. As the cyclic olefin-based resin, a polynorbornene-based resin is preferred.

Examples of the norbornene-based monomer include; norbornene, alkyl- and/or alkylidene-substituted products thereof such as 5-methyl-2-norbornene, 5-dimethyl-2-norbornene,
5-ethyl-2-norbornene, 5-butyl-2-norbornene, and
5-ethylidene-2-norbornene, and substituted products thereof with a polar group such as halogen; dicyclopentadiene and 2,3-dihydrodicyclopentadiene; dimethano octahydronaphthalene, alkyl- and/or alkylidene-substituted products thereof, and substituted products thereof with a polar group such as halogen, such as
6-methyl-1,4:5,8-dimethano-1,4,4a,5,6,7,8,8a-octahydronaphthalene,
6-ethyl-1,4:5,8-dimethano-1,4,4a,5,6,7,8,8a-octahydronaphthalene,
6-ethylidene-1,4:5,8-dimethano-1,4,4a,5,6,7,8,8a -octahydronaphthalene,
6-chloro-1,4:5,8-dimethano-1,4,4a,5,6,7,8,8a-octahydronaphthalene,
6-cyano-1,4:5,8-dimethano-1,4,4a,5,6,7,8,8a-octahydronaphthalene,
6-pyridyl-1,4:5,8-dimethano-1,4,4a,5,6,7,8,8a-octahydronaphthalene, and
6-methoxycarbonyl-1,4:5,8-dimethano-1,4,4a,5,6,7,8,8a -octahydronaphthalene; a trimer and a tetramer of cyclopentadiene such as 4,9:5,8-dimethano-3a,4,4a,5,8,8a,9,9a-octahydro1H-benzoindene and
4,11:5,10:6,9-trimethano-3a, 4,4a,5,5a,6,9,9a,10,10a,11, 11a-dodecahydro-1H-cyclopentaanthracene.

As the cyclic olefin-based resin, various products are commercially available. Examples of a commercially available polymer film containing a cyclic olefin-based resin include "Zeonex", "Zeonor" (trade name) manufactured by Hippon Zeon Co., Ltd., "Arton" (trade name) manufactured by JSR Corporation, "Topas" (trade name) manufactured by Ticona, and "APEL" (trade name) manufactured by Mitsui Chemical Inc.

As the cellulose-based resin, any appropriate resin can be adopted. The cellulose-based resin is preferably a cellulose organic acid ester or a cellulose-mixed organic acid ester in which a part or an entirety of a hydroxyl group of cellulose is replaced by an acetyl group, a propionyl group, and/or a butyl group. Specific examples of the cellulose organic acid ester include cellulose acetate, cellulose propionate, and cellulose butyrate. Specific examples of the cellulose-mixed organic acid ester include cellulose acetate propionate and cellulose acetate butyrate. The cellulose-based resin can be produced, for example, by a method described in paragraphs [0040] and [0041] of JP 2001-188128 A.

As cellulose-based resin, various products are commercially available. Examples of the commercially available polymer film containing a cellulose-based resin include FUJITAC series (ZRF80S, TD80UF, TDY-80UL (trade name)) manufactured by Fuji Photo Film Co., Ltd, and "KC8UX2M" (trade name) manufactured by Konica Minolta Opto, Inc.

The thickness of the above-mentioned base material is preferably 20 μm to 100 μm. By adjusting the thickness of the base material to the above-mentioned range, the handling properties and application properties of the base material become excellent.

The application rate of a solution in the step (3) above is preferably 50 mm/second or more, and more preferably 100 mm/second or more. By adjusting the application rate to the above-mentioned range, shearing force suitable for alignment of a polycyclic compound is applied to the solution used in the present invention, and a birefringent film having a high in-plane birefringent index and small thickness variations can be obtained.

As a method of applying the above-mentioned solution onto the surface of the base material, application methods using an appropriate coater may be suitably adopted. Examples of the above-mentioned coater include a reverse roll coater, a positive rotation roll coater, a gravure coater, a knife coater, a rod coater, a slot die coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Preferable examples include a reverse roll coater, a positive rotation roll coater, a gravure coater, a rod coater, a slot die coater, a slot orifice coater, a curtain coater, and a fountain coater. By application methods using the above-mentioned coaters, a birefringent film having small thickness variations can be obtained.

As a method of drying the above-mentioned solution, appropriate methods may be suitably adopted. Examples of the methods of drying the solution include a drying means such as an air circulation type temperature-controlled oven in which hot air or cold air circulates, a heater using a microwave or an infrared ray, a roll heated for regulating temperature, a heat pipe roll, or a metal belt.

It is preferred that a temperature for drying the above-mentioned solution be the isotropic phase transition temperature of the above-mentioned solution or lower, and that the solution be dried by gradually increasing a temperature from a low temperature to a high temperature. The above-mentioned drying temperature is preferably 10° C. to 80° C., and more preferably 20° C. to 60° C. When the drying temperature is within the above-mentioned temperature range, a birefringent film having small thickness variations can be obtained.

A time for drying the above-mentioned solution can be suitably selected according to a drying temperature or a type of solvent. In order to obtain a birefringent film having small thickness variations, the drying time is, for example, 1 to 30 minutes and preferably 1 to 10 minutes.

The production method for the birefringent film of the present invention preferably further includes the step (4) after the steps (1) to (3) described above:

Step (4): a step of bringing a solution containing at least one compound salt selected from the group consisting of an aluminum salt, barium salt, lead salt, chromium salt, strontium salt, and compound salt having two or more amino groups in the molecule into contact with the film obtained in the step (3) above.

The step (4) above is used for making the birefringent film to be obtained insoluble or slightly-soluble in water. Mentioned as the above-mentioned compound salt are, for example, aluminum chloride, barium chloride, lead chloride, chromium chloride, strontium chloride, 4,4'-tetramethyl diamino diphenylmethane hydrochloride, 2,2'-dipyridyl hydrochloride, 4,4'-dipyridyl hydrochloride, melamine hydrochloride, tetraminopyrimidine hydrochloride, etc. With such a compound salt, a birefringent film excellent in water resistance properties can be obtained.

The concentration of the above-mentioned compound salt in the solution containing the compound salt is preferably 3% by weight to 40% by weight, and particularly preferably 5% by weight to 30% by weight. A birefringent film excellent in durability can be obtained by bringing a birefringent film into contact with a solution containing a compound salt having a concentration in the above-mentioned range.

As a method of bringing the birefringent film obtained in the step (3) above into contact with a solution containing the above-mentioned compound salt, any suitable method, such as a method of applying a solution containing the above-mentioned compound salt onto the surface of the birefringent film and a method of immersing the birefringent film in a solution containing the above-mentioned compound salt, may be employed. When these methods are employed, it is preferred that the obtained birefringent film be washed with water or a suitable solvent. Further, by drying the film, a laminate excellent in adhesiveness of the interface between the base material and the birefringent film can be obtained.

[B. Outline of Birefringent Film of the Present Invention]

The birefringent film of the present invention is a birefringent film obtained in the production method of the present invention, in which the refractive index ellipsoid satisfies the relationship represented by nx>nz>ny.

The relationship "nx>nz>ny" of a refractive index ellipsoid refers to the optical anisotropy of a birefringent film, assuming that a refractive index in a direction in which the refractive index becomes maximum in a plane of a birefringent film (i.e., a slow axis direction) is nx, a refractive index in a direction perpendicular to a slow axis direction in a plane (i.e., a fast axis direction) is ny, and a refractive index in a thickness direction is nz.

The birefringent film of the present invention is produced by the characteristic production method of the present invention, and a refractive index ellipsoid satisfies the relationship: nx>nz>ny. Therefore, the birefringent film of the present invention can be a thin birefringent film with a satisfactory alignment property, in which a refractive index is controlled three-dimensionally and optical properties are unlikely to decrease when the birefringent film is placed under high temperature and high humidity.

In the production method of the present invention, a particular polycyclic compound containing a —SO$_3$M group and/or a —COOM group is used. Thus, a refractive index can be controlled three-dimensionally, and a refractive index ellipsoid satisfying the relationship: nx>nz>ny can be obtained. Further, the polycyclic compound is likely to form an association in a solution, and the order of the state in which the association is formed is high. Therefore, a birefringent film formed from such a solution exhibits a high alignment property. Further, since the solubility of the polycyclic compound with respect to a solvent is high, a thin film can be formed, and hence a thin birefringent film can be provided.

In the production method of the present invention, the surface of the base material is subjected to a hydrophilization treatment so that the contact angle of water at 23° C. becomes a particular value or less, before a solution exhibiting a nematic liquid crystal phase is applied to the base material, whereby a birefringent film with a satisfactory alignment property can be provided, in which optical properties are unlikely to decrease when the birefringent film is placed under high temperature and high humidity.

The in-plane birefringent index ($\Delta n[590]$=nx−ny) of the birefringent film of the present invention at a wavelength of 590 ran is preferably 0.05 or higher, more preferably 0.1 to 0.5, and particularly preferably 0.2 to 0.4. In should be noted that the above-mentioned $\Delta n[590]$ can be suitably adjusted to the above-mentioned range depending on the molecular structure of a polycyclic compound.

The thickness of the birefringent film of the present invention is preferably 0.05 μm to 10 μm, more preferably 0.1 μm to 8 μm, and particularly preferably 0.1 μm to 6 μm. By adjusting the thickness of the birefringent film to the above-mentioned range, when the birefringent film is, for example, used for a liquid crystal display apparatus, a range of retardation values useful for improvement of display properties can be obtained.

The transmittance of the birefringent film of the present invention at a wavelength of 590 nm is preferably 85% or more, and more preferably 90% or more.

The in-plane retardation value (Re[590]) of the birefringent film of the present invention at a wavelength of 590 nm may be adjusted to a suitable value according to the purpose. The above-mentioned Re[590] is 10 nm or more, preferably 20 nm to 1,000 nm, more preferably 50 nm to 500 nm, and particularly preferably 100 nm to 400 nm. In the specification, the in-plane retardation value (Re[λ]) refers to an in-plane retardation value at a wavelength of λ (nm) at 23° C. The Re[λ] can be calculated by the following equation; Re[λ]= (nx−ny)×d, when the film thickness is defined as d (nm).

The Rth[590] of the birefringent film of the present invention at a wavelength of 590 nm can be adjusted to a suitable value in a range where the refractive index ellipsoid satisfies the relationship represented by nx>nz>ny. A difference between the in-plane retardation value (Re[590]) and the thickness direction retardation value (Rth[590]) of the above-mentioned birefringent film at a wavelength of 590 nm is preferably 10 nm to 800 nm, more preferably 10 nm to 400 nm, and particularly preferably 10 nm to 200 nm. In the specification, the thickness direction retardation value (Rth [λ]) refers to a thickness direction retardation value at a wavelength of λ (nm) at 23° C. The Rth[λ] can be calculated by the following equation; Rth[λ]=(nx−nz)×d, when the film thickness is defined as d (nm).

The Nz coefficient of the birefringent film of the present invention is preferably more than 0 and less than 1, more preferably 0.1 to 0.8, particularly preferably 0.1 to 0.7, and most preferably 0.1 to 0.6. When the Nz coefficient falls into the above-mentioned range, the birefringent film of the present invention can be used for optical compensation of a liquid crystal cell of various driving modes. In the specification, the Nz coefficient refers to a value calculated from Rth[590]/Re[590].

The wavelength dispersion value (D) of the birefringent film of the present invention is preferably 1.05 or more, more preferably 1.06 to 1.15, and most preferably 1.07 to 1.12. In the specification, the wavelength dispersion value (D) is a value calculated from the following equation; D=Re[480]/Re [550]. Conventionally, among birefringent films produced by stretching a polymer film, a film showing such a sharp wavelength dependence has not been obtained. In the birefringent film of the present invention, a retardation value measured with a short-wavelength light is sufficiently larger than a retardation value measured with a long-wavelength light. Thus, the demonstration of a sharp wavelength dependence of retardation is one of the features of the birefringent film of the present invention.

The optical properties of the birefringent film of the present invention are unlikely to decrease when placed under high temperature and high humidity. Specifically, an in-plane retardation change ($\Delta(\Delta nd)$=$\Delta nd$ (after 200 hours)−$\Delta nd$ (after 0 hour)) in the case where the birefringent film is placed in an atmosphere at a temperature of 60° C. and humidity of 90% for 200 hours is preferably within ±10 nm, more preferably within ±8 nm, much more preferably within ±6 nm, particularly preferably within ±4 nm, and most preferably within ±2 nm.

The birefringent film of the present invention has a satisfactory alignment property. Specifically, the light leakage (Y-value) obtained by placing a birefringent film between two polarizing plates having a crossed-Nicols relationship and measuring the film by a high-speed integrating sphere type spectral transmittance measuring machine (for example, DOT-3C manufactured by Murakami Color Research Laboratory Co., Ltd.) is preferably 1.0 or less, more preferably 0.8 or less, more preferably 0.6 or less, particularly preferably 0.4 or less, and most preferably 0.35 or less.

[C. Intended Use of Birefringent Film]

There is no limitation to the intended use of the birefringent film of the present invention. Typically, a λ/4 plate, λ/2 plate, viewing-angle widening film, and antireflection film for flatpanel displays of a liquid crystal display apparatus are mentioned. In one embodiment, the above-mentioned birefringent film may be laminated with a polarizer to form a laminate. Specific examples of the laminate include a polarizing plate.

[D. Laminate of the Present Invention]

The laminate of the present invention has at least the birefringent film of the present invention and a polarizer. The laminate of the present invention may include a laminated film having at least a base material and the birefringent film of the present invention, or may include another birefringent film and any suitable protective layer. Practically, between each layer of a component member of the laminate of the present invention, any appropriate adhesion layer is provided, and thus, a polarizer and each component member are attached to each other.

As the above-mentioned polarizer, any suitable substances can be employed insofar as the substances convert natural light or polarised light into linearly polarized light. The above-mentioned polarizer is preferably a stretched film containing, as a main component, a polyvinyl alcohol-based resin containing iodine or dichromatic dye. The thickness of the above-mentioned polarizer is usually 5 μm to 50 μm.

Any suitable substances can be selected as the above-mentioned adhesion layer insofar as the substances join surfaces of adjacent members, and integrate the members with a practically sufficient adhesive strength in a practically sufficient adhesion time. As a material forming the above-mentioned adhesion layer, adhesives, pressure-sensitive adhesives, and anchor coat agents are mentioned, for example. The above-mentioned adhesion layer may have a multilayer structure in which an anchor coat agent layer is formed on the surface of an adherend, and an adhesive layer or pressure-sensitive adhesive layer is formed thereon, or may be a thin layer (also referred to as a hairline) which cannot be recognized macroscopically. An adhesion layer disposed at one side of the polarizer and an adhesion layer disposed at the other side thereof may be the same or different with each other.

In the laminate of the present invention, the angle formed by the direction of an absorption axis of the polarizer and the direction of a slow axis of the birefringent film of the present invention can be suitably determined according to the object of the laminate. When the laminate is used, for example, as an antireflection film, the angle formed by the direction of an absorption axis of the polarizer and the direction of a slow axis of the birefringent film of the present invention is preferably 25° to 65° and more preferably 35° to 55°. When the laminate of the present invention is used as a viewing angle widening film, the angle formed by the direction of an absorption axis of the polarizer and the direction of a slow axis of the birefringent film of the present invention is substantially parallel or substantially perpendicular to each other. The "substantially parallel" as used in the specification refers to that the angle formed by the direction of the absorption axis of the polarizer and the direction of the slow axis of the birefringent film of the present invention encompasses a range of 0°±10°, and is preferably 0°±5°. The "substantially perpendicular" as used in the specification refers to that the angle formed by the direction of the absorption axis of the polarizer and the direction of the slow axis of the birefringent film of the present invention encompasses a range of 90±10°, and is preferably 90°±5°.

EXAMPLES

Hereinafter, the present invention will be further described with reference to the examples and the comparative examples. It should be noted that the present invention is not limited only to the following examples.

(1) Method of Measuring Thickness:

When the thickness was lower than 10 μm, the thickness was measured using a spectrophotometer for thin films [Otsuka Electronics Co., Ltd., product name "Instant multi-photometry system MCPD-2000")]. When the thickness was 10 μm or more, the thickness was measured using a digital micrometer "KC-351C type" manufactured by Anritsu Company.

(2) Method of Measuring Transmittance (T[590]), In-plane Birefringent Index (Δn[590]), Retardation Value (Re[λ], Rth [λ]):

Transmittance (T[590]), in-plane birefringent index (Δn [590]), retardation value (Re[λ], Rth[λ]) were measured at 23° C. using "KOBRA21-ADH" (trade name) manufacture by Oji Scientific Instruments. Note that an average refractive index was determined by using measured values obtained with the use of an Abbe refractometer (Atago Co., Ltd., product name "DR-M4").

(3) Method of Measuring Electrical Conductivity:

With an aqueous solution whose concentration was adjusted to 0.05% by weight, an electrode of a solution electric conductivity meter [manufactured by KYOTO ELECTRONICS MANUFACTURING CO., LTD., product name "CM-117"] was washed. Then, a 1 cm$^3$ container connected to the electrode was filled with a sample. Then, a point where a displayed electrical conductivity becomes constant was defined as a measurement value.

(4) Method of Measuring Contact Angle of Water:

A liquid was added dropwise to a base material, and the contact angle after 5 seconds was measured using a solid-liquid phase interface analyzer [manufactured by Kyowa Interface Science Co., Ltd., product name "Drop Master300"]. As the measurement, static contact angle measurement was carried out. Ultrapure water was used as water and a droplet was 0.5 μl. The measurement was repeated ten times for each base material, and the average value of the obtained measurement values was defined as a measurement value.

(5) Reliability Test Under High Temperature and High Humidity

An in-plane retardation change (Δ(Δnd)=Δnd (after 200 hours)−Δnd (after 0 hour)) in the case where a birefringent film was placed in an atmosphere at a temperature of 60° C. and a humidity of 90% for 200 hours was measured.

(6) Evaluation of an Alignment Property

A birefringent film was placed between two polarizing plates ("SEG1224DU" (trade name) manufactured by Nitto Denko Corporation) having a crossed-Nicols relationship so that the slow axis of the film was coaxial with the absorption axis of either of the two polarizing plates, and a light leakage (Y-value) was measured by a high-speed integrating sphere type spectral transmittance measuring machine (for example, DOT-3C manufactured by Murakami Color Research Laboratory Co., Ltd.).

Synthesis Example 1

<Synthesis of acenaphtho[1,2-b]quinoxaline-9-carboxylic acid>

500 ml of dimethylformamide were added to a mixture of 10 g of purified acenaphthenequinone and 8.4 g of purified 3,4-diaminobenzoic acid. The reactant was continuously stirred at room temperature for 21 hours. The precipitate was filtered to thereby obtain a crude product. The crude product was dissolved in heated dimethylformamide, and filtered again. Then, the resultant was washed with dimethylformamide and water for purification. Thus, obtained was acenaphtho[1,2-b]quinoxaline-9-carboxylic acid.

Synthesis Example 2

<Synthesis of Mixture of 2-sulfo-acenaphtho[1,2-b]quinoxaline-9-carboxylic acid ammonium and 5-sulfo-acenaphtho[1,2-b]quinoxaline 9-carboxylic acid ammonium>

As shown in the reaction path described later, 3 g of acenaphtho[1,2-b]quinoxaline-9-carboxylic acid obtained in Synthesis Example 1 were added to 30% fuming sulfuric acid (15 ml). The reactant was stirred at 70° C. for 17.5 hours. The obtained solution was diluted at a temperature of 40° C. to 50° C. with 33 ml of wafer, and further stirred for 12 hours. The precipitate was filtered to thereby obtain a mixture containing 5-sulfo-acenaphtho[1,2-b]quinoxaline-9-carboxylic acid and 2-sulfo-acenaphtho[1,2-b]quinoxaline-9-carboxylic acid.

The mixture was dissolved in 2 L of pure water (electrical conductivity: 1.7 μS/cm), and ammonium hydroxide was further added thereto to neutralize acid. The obtained aqueous solution was put in a supply tank, and purified using a triple flat membrane evaluation device equipped with a reverse osmosis membrane (manufactured by NITTO DENKO CORP., trade name "NTR-7430") until the electrical conductivity of waste liquid of the device reached 14.3 μS/cm (in terms of 1% by weight). Next, the purified aqueous solution was adjusted using a rotary evaporator in such a manner that the concentration of the polycyclic compound in the aqueous solution became 21.1% by weight. $hen the aqueous solution obtained here was observed under a polarization microscope, a nematic liquid crystal phase was developed at 23° C. By liquid chromatographic analysis, the mixing ratio of 2-sulfo-acenaphtho[1,2-b]-quinoxaline-9-carboxylic acid ammonium, and 5-sulfo-acenaphtho[1,2-b]quinoxaline-9-carboxylic acid ammonium was determined, which showed that the composition ratio was 46:54.

[Chemical Formula 5]

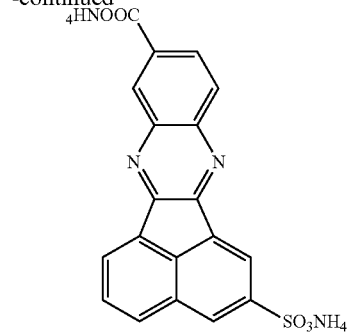

Example 1

The surface of a polynorbornene-based resin film ("Zeonor" (trade name) having a thickness of 100 μm, manufactured by Nippon Zeon Co., Ltd.) was subjected to a corona treatment (strength: 0.05kW, treatment speed: 0.5 m/min.), and the contract angle of water at 23° C. was set to be 40°. Next, the aqueous solution obtained in Synthesis Example 2 was applied to the surface of the film subjected to the corona treatment, using a bar coater ("mayer rot HS1.5" (trade name) manufactured by BUSCHMAN Corporation), and the applied surf ace was dried while being sprayed with air in a thermostatic chamber at 23° C. and further dried for 3 minutes in an air circulation type drying oven at 40° C. Consequently, a birefringent film (1) whose refractive index ellipsoid has a relationship: nx>nz>ny was obtained on the surface of the polynorbornene-based resin film.

The thickness of the birefringent film (1) was 0.54 μm, and the in-plane retardation and thereof was 162 nm.

As a result of a reliability test under high temperature and high humidity of the birefringent film (1), an in-plane retardation change in the case where the birefringent film (1) was placed in an atmosphere at a temperature of 60° C. and a humidity of 90% for 200 hours was within ±2 nm. The alignment property of the birefringent film (1) was evaluated; as a result, a Y-value was 0.18, and an alignment property was satisfactory. FIG. 1 shows an image observed with a polarization microscope of the birefringent film (1).

Comparative Example 1

An attempt was made so as to apply the aqueous solution obtained in Synthesis Example 2 to the surface of the polynorbornene-based resin film ("Zeonor" (trade name) having a thickness of 100 μm, manufactured by Nippon Zeon Co., Ltd.) not subjected to the corona treatment (contact angle of water at 23° C. was 89°), using a bar coater ("mayer rot HS1.5" (trade name) manufactured by BUSCHMAN Corporation); however, the surface repelled the application liquid, so that it was impossible to apply the aqueous solution to the surface.

Comparative Example 2

A birefringent film (C2) was obtained in the same way as in Example 1, except that the surface of the polynorbornene-based resin film ("Zeonor" (trade name) having a thickness of 100 μm, manufactured by Nippon Zeon Co., Ltd.) was subjected to a corona treatment (strength: 0.05 kW, treatment speed: 15 m/min.), and the contact angle of water at 23° C. was set to be 64°.

The thickness of the birefringent film (C2) was 0.54 μm, and the in-plane retardation Δnd was 162 nm.

Figure 2:
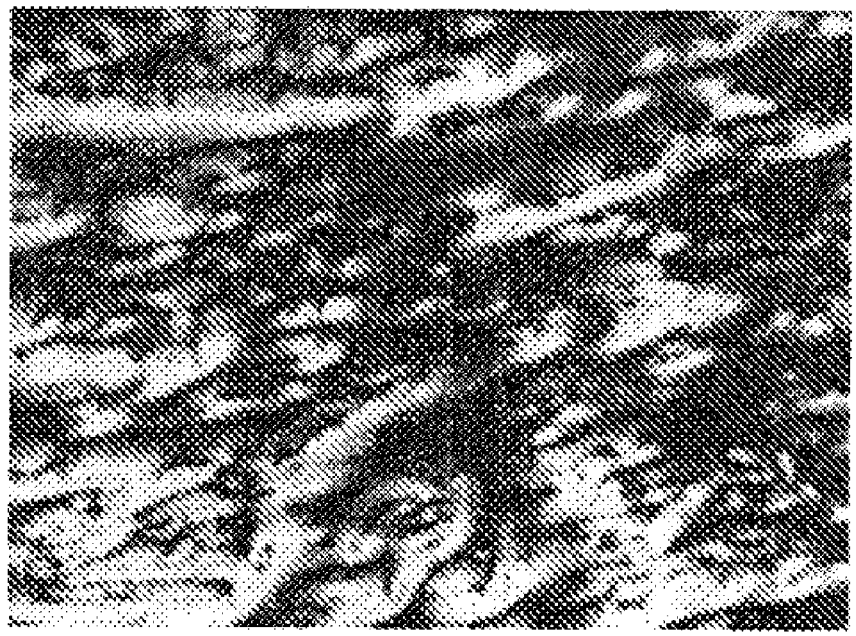
[FIG. 2] An image observed with a polarization microscope of a birefringent film (C2).

The alignment property of the birefringent film (C2) was evaluated; as a result, a Y-value was 8.8, and an alignment property was unsatisfactory due to a number of domains. FIG. 2 shows an image observed with a polarization microscope of the birefringent film (C2).

Comparative Example 3

A birefringent film (C3) was obtained in the same way as in Example 1, except that the surface of the polynorbornene-based resin film ("Zeonor" (trade name) having a thickness of 100 μm, manufactured by Nippon Zeon Co., Ltd.) was subjected to a corona treatment (strength: 0.05 kW, treatment speed: 3 m/min.), and the contact angle of water at 23° C. was set to be 53°.

The thickness of the birefringent film (C3) was 0.54 μm, and the in-plane retardation Δnd was 162 nm.

Figure 3:
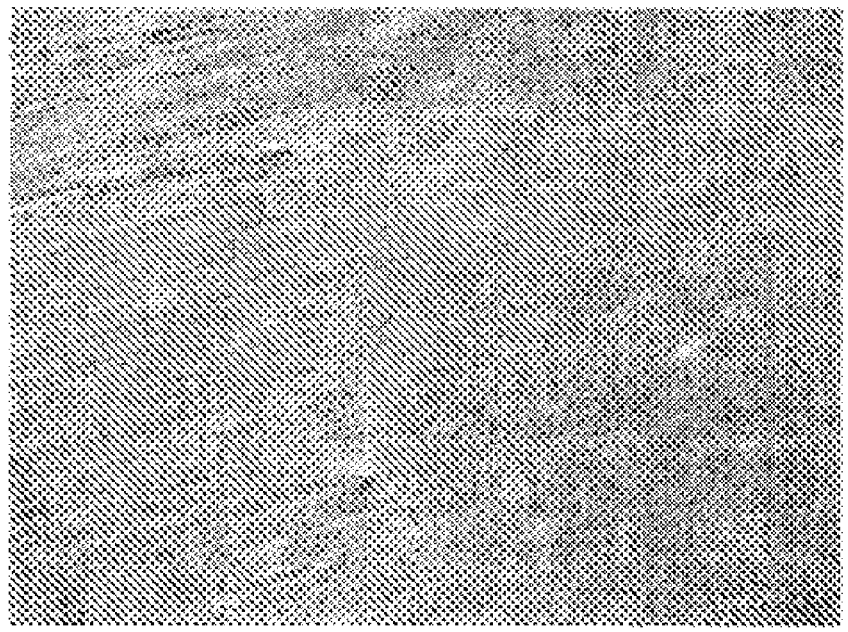
[FIG. 3] An image observed with a polarization microscope of a birefringent film (C3).

As a result of a reliability test under high temperature and high humidity of the birefringent film (C3), an in-plane retardation change in the case where the birefringent film (C3) was placed in an atmosphere at a temperature of 60° C. and a humidity of 90% for 200 hours was more than ±10 nm. The alignment property of the birefringent film (C3) was evaluated; as a result, a Y-value was 0.23, and an alignment property was almost satisfactory. FIG. 3 shows an image observed with a polarization microscope of the birefringent film (C3).

INDUSTRIAL APPLICABILITY

As described above, the birefringent film obtained by the production method of the present invention is thin and has a satisfactory alignment property, in which a refractive index is controlled three-dimensionally, and optical properties are unlikely to decrease in the case where the birefringent film is placed under high temperature and high humidity. Therefore, for example, the use of the birefringent film in a liquid crystal display apparatus can greatly enhance display properties under various environments and greatly contribute to the reduction in thickness.

The invention claimed is:

1. A production method for a birefringent film, comprising:
   the step (1) of preparing a solution that exhibits a nematic liquid crystal phase, containing at least one kind of polycyclic compound containing a —SO$_3$M group and/or a —COOM group (M represents a counter ion) and a solvent;
   the step (2) of preparing a base material at least one surface of which is subjected to a hydrophilization treatment; and
   the step (3) of applying the solution prepared in the step (1) to the surface of the base material prepared in the step (2), the surface being subjected to the hydrophilization treatment, followed by drying,
   wherein a contact angle of water at 23° C. on the surface of the base material prepared in the step (2), the surface being subjected to the hydrophilization treatment, is 45° or less.

2. A production method according to claim 1, wherein the hydrophilization treatment is at least one selected from a corona treatment, a plasma treatment, an ultrasonic cleaning treatment, an alkali treatment, and an anchor coat treatment.

3. A production method according to claim 1, wherein the base material comprises a glass substrate or a polymer film.

4. A production method according to claim 1, wherein the polycyclic compound comprises an acenaphtho [1,2-b]quinoxaline derivative represented by General Formula (I) shown below:
where k and l each independently represent an integer of 0 to 4; m and n each independently represent an integer of 0 to 6 and each M represent a counter ion; and k, l, m, and n are not simultaneously 0:

[Chemical Formula 1]

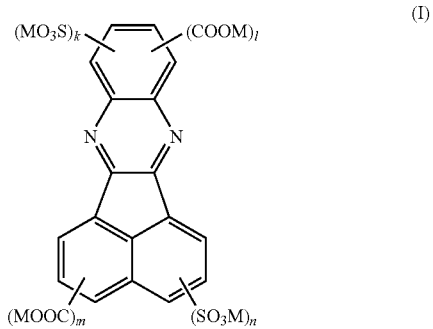

5. A birefringent film, which is obtained by the production method according to claim 1.

6. A birefringent film according to claim 5, wherein a refractive index ellipsoid satisfies a relationship: nx>nz>ny.

7. A birefringent film according to claim 5, wherein a thickness of the birefringent film is 0.05 μm to 10 μm.

8. A laminate, which has at least the birefringent film according to claim 5 and a polarizer.

* * * * *